United States Patent Office 2,865,961
Patented Dec. 23, 1958

2,865,961

N,N' DIGUANIDO DIIMIDES OF QUINONE-DIOLEFIN ADDUCTS

Siegfried Petersen, Leverkusen-Schlebusch, and Gerhard Domagk, Wuppertal-Elberfeld, Germany, assignors to Schenley Industries, Inc., New York, N. Y., a corporation of Delaware No Drawing. Application February 28, 1956
Serial No. 568,166

Claims priority, application Germany March 4, 1955

15 Claims. (Cl. 260—564)

This invention relates to, and has as its object, the production of novel N,N' diguanido diimides of quinone-diolefin adducts which have been found to constitute valuable pharmaceutical products showing activity against streptococci and pneumonococci, and extremely effective activity against diphtheria bacilli. Due to the strong bacteriostatic effect of the novel compounds, in accordance with the invention, against diphtheria bacilli, the same have proven very effective as a mouth disinfectant for diphtheria carriers.

The novel compounds, in accordance with the invention, have the structure of an adduct of p-benzoquinone or p-napthoquinone with a conjugated diolefin in which both oxygen atoms of the quinone nucleus are replaced by nitrogen atoms substituted with a guanido or substituted guanido radical.

The compounds, in accordance with the invention, may be formed by reacting a quinone-diolefin adduct with aminoguanidine or a substituted aminoguanidine still containing a free $NH_2$—N group in the molar ratio of 1:2.

The starting quinone-diolefin adducts are a Diels-Alder adduct formed by the addition of a conjugated olefin to p-benzoquinone or p-naththoquinone in the molar ratio of 1:1. These Diels-Alder adducts are described, for example, on pages 136–192 of the book "Organic Reactions," volume 5, 1949, published by John Wiley & Sons in New York.

Any of the known conjugated diolefins which will form an adduct with quinone may be used as the starting diolefin for the formation of the adduct in accordance with the invention. Examples of such diolefins include butadiene, isoprene, 2.3-dimethylbutadiene, 2-chlorobutadiene, cyclopentadiene, cyclohexadiene, etc.

Examples of the starting aminoguanidines which may be used in accordance with the invention include aminoguanidine itself and its aliphatic or aromatic substituted derivatives which still contain a free hydrazino group such as 4-methyl-, 4-ethyl-, 4-phenyl-, or 4-benzyl-aminoguanidine. Additionally, nitroaminoguanidine or 2-hydrazino-2-imidazoline may be used.

The reaction is effected with the aminoguanidines in the form of their salts and is preferably carried out in an aqueous or an aqueous-alcoholic solution. The reaction will proceed under relatively mild conditions as, for example, at temperatures between about 0 and 60° C. The diguanido diamides of the adducts used are directly formed in the reaction period. Though it is also possible to form mono derivatives the same are generally obtained with greater difficulty and generally in an impure form. The formation of the di-compounds in accordance with the invention is rather surprising since, as is well known, other hydrazine derivatives such as semicarbazides generally yield the mono-derivatives with the di-derivatives seldom being obtained in a pure form.

The compounds, in accordance with the invention, are generally obtained in the form of their salts as, for example, the di-nitrate salt and the di-hydrochloride salt. The compounds may be used in the form of these salts or the free basis may be recovered with the use of a weak alkali such as ammonia.

The reaction, in accordance with the invention, may be illustrated for example by the reaction between aminoguanidine and the adduct of p-benzoquinone and cyclopentadiene which proceeds as follows:

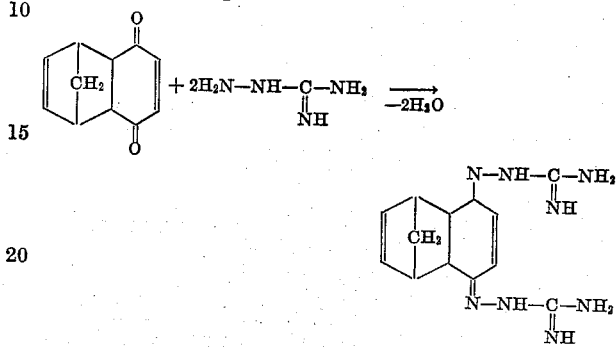

The adduct between the p-benzoquinone and cyclopentadiene may be designated as cyclopentadienequinone or in accordance with the systematic chemical abstracts nomenclature as 1,4,4a,8a-tetrahydro-1,4-methanonaphthalene-5,8-dione. The diguanido-diamide formed by the reaction may be designated N,N'-diguanido-1,4,4a,8a-tetrahydro - 1,4 - methanonaphthalene - 5,8 - diimide. This compound has proven particularly active against diphtheria bacilli and may be used in the form of its salt, as for example the dinitrate salt.

The following examples are given to further illustrate the invention and not to limit the same.

Example 1

Sixty-eight grams (½ mol) of aminoguanidine-bicarbonate with 40 cc. of concentrated nitric acid ($d=1.5$) are dissolved with 300 cc. of warm water. The mixture is cooled to 30° C. and 34.8 grams (²/₁₀ mol) of cyclopentadienequinone, dissolved in 200 cc. of methanol, are added. After a short period the dinitrate salt of N,N'-diguanido - 1,4,4a,8a - tetrahydro - 1,4-methanonaphthalene - 5,8 - diimide separates in yellow crystals with slight exothermic reaction. The mixture is stirred for 2 hours, the precipitate separated by suction filtration and the new compound is washed with methanol and ether. In order to avoid discoloration it is preferably dried at low temperatures. The yield obtained is 73.5 grams. The compound discolors in the melting point tube without showing a defined point of decomposition.

The compound has the formula:

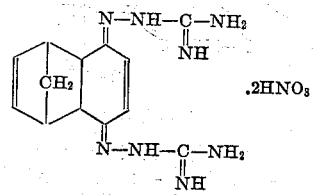

and can be recrystallized by dissolving in three times the amount of dimethylformamide at 40° C. and adding six times the amount of water. The compound slowly crystallizes out in a refrigerator.

Under similar conditions the corresponding sulfate may be obtained with aminoguanidine sulfate. This salt decomposes at about 230° with evolution of gas.

Example 2

Sixty-eight grams (½ mol) of aminoguanidine-bicarbonate are dissolved in a mixture of 40 cc. concentrated hydrochloric acid and 125 cc. of water. Thereupon 34.8 grams (²/₁₀ mol) of cyclopentadienequinone in 200 cc. of methanol are added and the temperature is kept at 15° C. The solution remains clear. Only after the addition of 50 cc. of concentrated hydrochloric acid, diluted with 200 cc. of water, the dihydrochloride dihydrate crystallizes slowly within a few hours in a yield of 66 grams.

The compound dissolves in hot water with yellow color. After the addition of hydrochloric acid the color becomes lighter. Beautiful rhombic greenish-white crystals separate. The analytical values correspond to the formula:

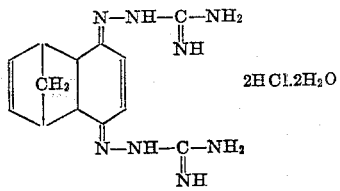

The compound does not show any M. P. For the production of the free base 9 grams of the hydrochloride described are heated in 150 cc. of semi-diluted methanol to boiling and 100 cc. of concentrated ammonium solution are added. A clear yellow solution is obtained from which yellowish, glittering and voluminous crystals separate upon cooling. Above 150° C. the compound becomes slowly orange-red and decomposes at about 238° with evolution of gas.

*Example 3*

Seventeen and two-tenths grams of cyclopentadienequinone in 100 cc. of alcohol are dropped within half an hour to the solution of 38 grams of 2-hydrazino-2-imidazoline hydrobromide having the formula:

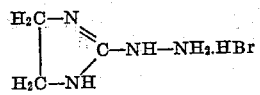

in 200 cc. of water and 20 cc. of concentrated hydrochloric acid. The mixture is kept at 40° C. for a further hour. Upon cooling and rubbing 45 grams of yellowish crystals separate. These are dissolved again in 150 cc. of warm water. After the addition of 50 cc. of concentrated hydrochloric acid the dihydrochloride of N,N'-di - [1 - (2 - imidazolinyl)amino] - 1,4,4a,8a - tetrahydro-1,4-methanonaphthalene-5,8-dimide separates with a light yellow color. The compound contains 4 mol of crystal water, decomposes at about 258° C. and has the formula:

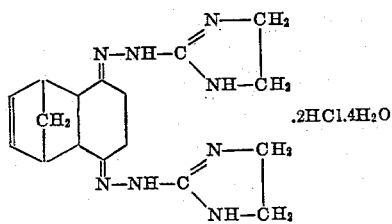

*Example 4*

A boiling hot solution of 37.6 grams (²/₁₀ mol) of 6,7 - dimethyl - 4a,5,8,8a - tetrahydronaphthalene - 1,4-dione (adduct of 2,3-dimethylbutadiene and p-benzoquinone) is slowly added to a solution of ½ mol of aminoguanidine-hydrochloride obtainable according to Example 2. The quinone addition product which precipitates at first dissolves clearly within 2 hours. Upon cooling some resin is obtained which is discarded. The alcohol is evaporated in vacuo and the desired compound crystallizes slowly in the form of hard yellowish crystals. These are dissolved in hot water. The dihydrochloride of N,N'-diguanido-6,7-dimethyl-4a,5,8,8a-tetrahydronaphthalene-1,4-diimide crystallizes again after the addition of hydrochloric acid. The product does not show any M. P. and has the formula:

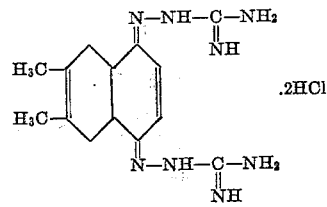

*Example 5*

If the cyclopentadienequinone of Example 2 is replaced by the equivalent amount of 4a,5,8,8a-tetrahydronaphthalene-1,4-dione (adduct of butadiene and 1,4-benzoquinone) and the same experiments are repeated, a compound is obtained which decomposes at about 228–230° C. The analytical date corresponds to the formula:

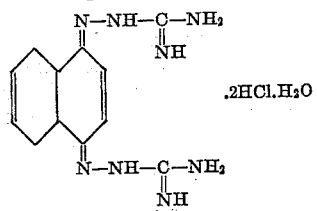

and may be designated dihydrochloride monohydrate of N,N' - diguanido - 4a,5,8,8a - tetrahydronaphthalene - 1,4-dione.

*Example 6*

A solution of 30 grams of cyclopentadienenaphthoquinone, 1,4,4a,8a - tetrahydro - 1,4 - methanoanthracene-9,10-dione, in alcohol is added at 40° C. to a hydrochloric acid solution of ½ mol of aminoguanidine-hydrochloride. From the solution which is at first clear yellowish crystals separate after a few days which are recrystallized from methanol and are thus obtained nearly white. The compound has the formula:

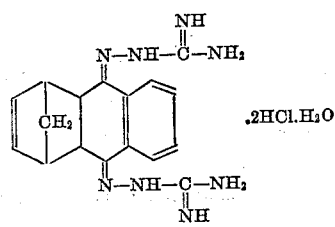

decomposes slowly at 200° C. and with higher speed at 220° C., and is the dihydrochloride monohydrate of N,N' - diguanido - 1,4,4a,8a - tetrahydro - 1,4 - methanoanthracene-9,10-dione.

We claim:
1. The dinitrate salt of N,N'-diguanido-1,4,4a,8a-tetrahydro-1,4-methanonaphthalene-5,8-diimide.
2. The dihydrochloride salt of N,N'-diguanido-1,4,-4a,8a-tetrahydro-1,4 - methanonaphthalene - 5,8-diimide.
3. Dihydrochloride of N,N'-diguanido-6,7-dimethyl-4a,5,8,8a-tetrahydronaphthalene-1,4-diimide.
4. Dihydrochloride salt of N,N'-diguanido-4a,5,8,8a-tetrahydronaphthalene-1,4-dione.
5. The dihydrochloride salt of N,N'-diguanido-1,4,4a,8a-tetrahydro-1,4-methanoanthracene-9,10-dione.
6. The compound N,N'-diguanido-1,4,4a,8a-tetrahydro-1,4-methanonaphthalene-5,8-diimide.
7. The compound N,N' - diguanido - 6,7 - dimethyl-4a,5,8,8a-tetrahydronaphthalene-1,4-diimide.
8. The compound N,N'-diguanido-4a,5,8,8a-tetrahydro-napthalene-1,4-dione.
9. The compound N,N'-diguanido-1,4,4a,8a-tetrahydro-1,4-methanoanthracene-9,10-dione.
10. A member selected from the group consisting of the N,N'-diguanido diimides of the Diels-Alder adduct of an aryl quinone selected from the group consisting of p- benzoquinone and p-naphthoquinone, and a conjugated diolefin selected from the group consisting of butadiene, isoprene, 2,3-dimethylbutadiene, 2-chlorobutadiene, cyclopentadiene and cyclohexadiene, and salts of said adduct.

11. The N,N'-diguanido diimide of the p-naphthoquinonecyclopentadiene Diels-Alder adduct.

12. A salt of the N,N'-diguanido diimide of the p-naphthoquinone cyclopentadiene Diels-Alder adduct.

13. The N,N'-diguanido diimide of the p-benzoquinone-cyclopentadiene Diels-Alder adduct.

14. A salt of the N,N'-diguanido diimide of the p-benzoquinone-cyclopentadiene Diels-Alder adduct.

15. Process for the production of N,N'-diguanido diimides of the Diels-Alder adduct of a conjugated diolefin selected from the group consisting of butadiene, isoprene, 2,3-dimethyl-butadiene, cyclopentadiene and cyclohexadiene and a quinone selected from the group consisting of p-benzoquinone and p-naphthoquinone which comprises contacting a Diels-Alder adduct of a conjugated olefin selected from the group consisting of butadiene, isoprene, 2,3-dimethyl-butadiene, 2-chloro-butadiene, cyclopentadiene and cyclohexadiene and a quinone selected from the group consisting of p-benzoquinone and p-naphthoquinone, with an aminoguanidine having a free N—$NH_2$ group and recovering the addition product formed containing said adduct and said aminoguanidine in a molar ratio of 1:1.

References Cited in the file of this patent

UNITED STATES PATENTS

| | | |
|---|---|---|
| 2,422,089 | Fletcher | June 10, 1947 |
| 2,569,415 | Hartmann et al. | Sept. 25, 1951 |
| 2,647,125 | Gunderson | July 28, 1953 |

OTHER REFERENCES

Fujikawa: Chem. Abstracts, vol. 46, column 8779 (1952).

Fujikawa: Chem. Abstracts, vol. 48, column 229 (1954).

Hayashi: Chem. Abstracts, vol. 49, column 15061 (1955).